Figure 1:
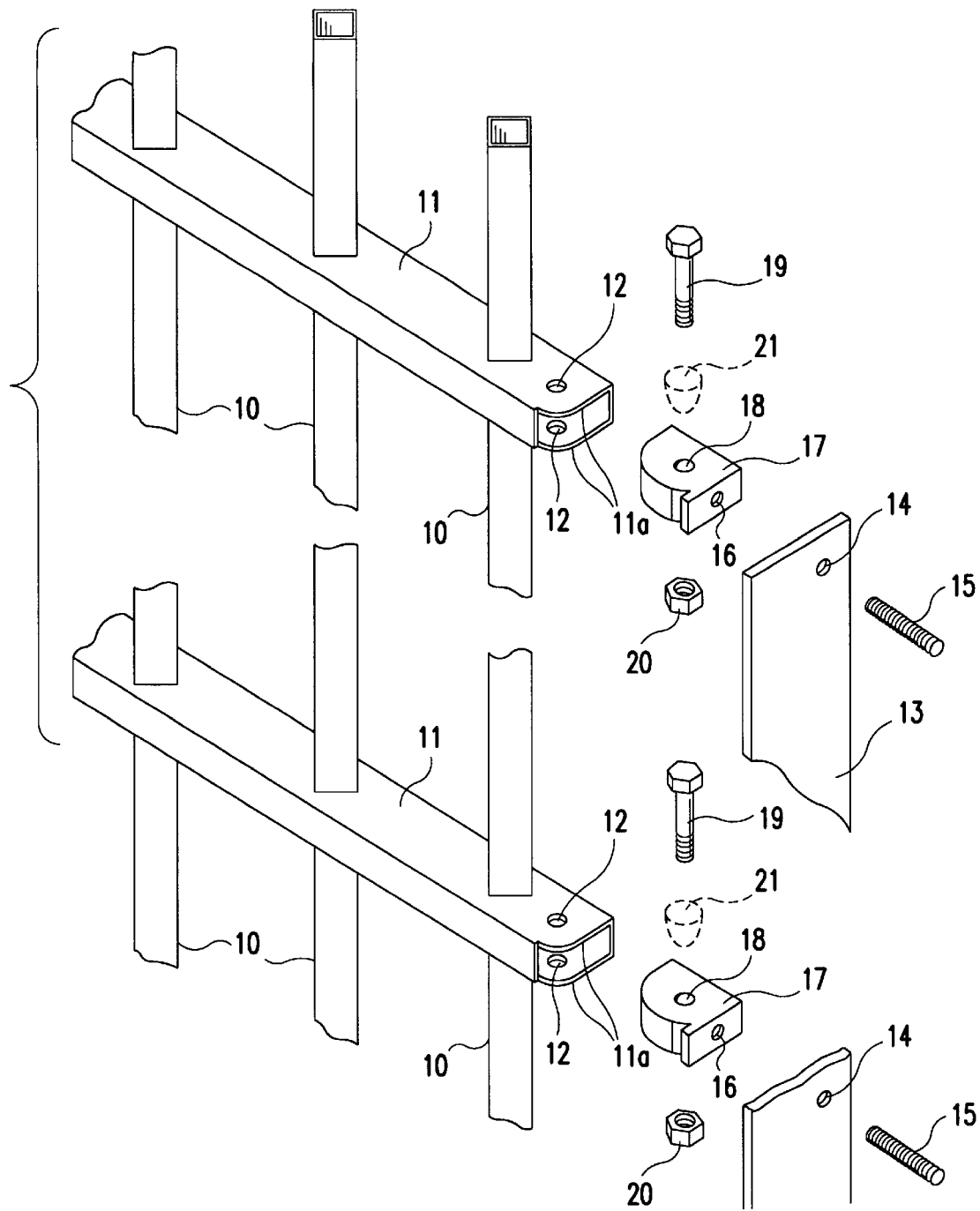

United States Patent

Summers

[11] Patent Number: 5,964,452
[45] Date of Patent: Oct. 12, 1999

[54] FIXING

[76] Inventor: Dennis Arthur Summers, 80 New Road, Silverbridge, Newry, County Down BT35 9LN, United Kingdom

[21] Appl. No.: 08/973,166

[22] PCT Filed: May 22, 1996

[86] PCT No.: PCT/GB96/01222

§ 371 Date: Nov. 19, 1997

§ 102(e) Date: Nov. 19, 1997

[87] PCT Pub. No.: WO96/37670

PCT Pub. Date: Nov. 28, 1996

[30] Foreign Application Priority Data

May 22, 1995 [GB] United Kingdom .................. 9510818

[51] Int. Cl.$^6$ .................................................. E04H 17/24
[52] U.S. Cl. ................................ 256/65; 256/60; 256/59
[58] Field of Search ................................ 256/59, 65, 21, 256/22, 73, 24, 25, 26, 60, 68

[56] References Cited

U.S. PATENT DOCUMENTS

| | | | |
|---|---|---|---|
| 1,757,686 | 5/1930 | Rosenbaum | 256/22 X |
| 2,715,513 | 8/1955 | Kools | 256/21 |
| 2,976,021 | 3/1961 | Stefan | 256/65 |
| 3,258,251 | 6/1966 | Culter | 256/22 |
| 3,772,837 | 11/1973 | Hunt | 256/65 X |
| 3,847,489 | 11/1974 | Van Riper . | |
| 3,879,017 | 4/1975 | Maxcy et al. . | |
| 4,623,128 | 11/1986 | Dutch et al. | 256/65 |

FOREIGN PATENT DOCUMENTS

| | | | |
|---|---|---|---|
| 0 028 193 | 5/1981 | European Pat. Off. . | |
| 2542356 | 9/1984 | France | 256/73 |
| 2156527 | 5/1973 | Germany | 256/21 |
| 3404947 | 8/1985 | Germany . | |
| 57568 | 4/1969 | Luxembourg . | |

*Primary Examiner*—Harry C. Kim
*Attorney, Agent, or Firm*—Lane, Aitken & McCann

[57] ABSTRACT

A combined mounting and blanking spigot for providing fixing between a rectangular cross-section tubular rail and a post, comprising a solid member having a height and width slightly less than that of the interior dimensions of the rail and a length sufficient to blank a gap between the rail and post. One end surface is planar for attachment to the post and one side surface is planar, the other end and other side surfaces being formed to be arcuate or cut away at their adjacent corner. An aperture is formed vertically through the spigot at substantially the midpoint of the upper surface area thereof. A railing unit having at least two rails attached to a post by the spigots is also disclosed.

7 Claims, 2 Drawing Sheets

FIXING

The invention relates to fixings and more particularly to fixing devices and methods to facilitate the fixing of a preformed railing unit to a mounting post therefor.

My copending UK Patent application no. 94 148 19.1 discloses a method of producing and a railing unit in which upright railing members are located between longitudinally extending horizontal mounting rails having a rectangular tubular cross-section. The attachment of such railing units to a support post when the railing units are located in one direction or normal thereto can be achieved simply without leaving gaps for the ingress of moisture. However, when it is required to attach such railing units to posts at an angle less than 90°, this is difficult to achieve without leaving a gap between the post and the interior of the tubular mounting rails.

It is an object of the present invention to obviate or mitigate the above problem.

According to one aspect of the invention there is provided a combined mounting and blanking spigot for providing fixing between a rectangular cross-section tubular rail and a post, comprising a solid member having a height and width slightly less than that of the interior dimensions of the rail and a length sufficient to blank a gap between the rail and post, one end surface being planar for attachment to the post, one side surface being planar, the other end and other side surfaces being formed to be arcuate or cut away at their adjacent corner and an aperture being formed vertically therethrough at substantially the midpoint of the upper surface area thereof.

Preferably a screw threaded aperture is formed in said one end surface for receiving a fixing stud for attachment to the post.

A generally 'V'-shaped notch may be formed in said other side surface adjacent said one end.

Preferably the spigot is formed by drop forging.

According to a further aspect of the invention there is provided a railing unit including at least two longitudinally extending horizontal mounting rails having a rectangular tubular cross-section each attached to a support post utilising a mounting and blanking spigot as defined in any one of the next preceding four paragraphs.

According to yet a further aspect of the invention there is provided a method of mounting a railing unit including at least two longitudinally extending horizontal mounting rails having a rectangular tubular cross-section to a support post therefor which comprises attaching spigots as hereinbefore defined in the fourth to seventh paragraphs to the support post at heights to correspond with the spacing of the support rails, locating such spigots in the ends of the support rails, locating fixing bolts through apertures in the support rails and the aperture in the spigot, adjusting the required direction of the railing unit and tightening the fixing bolts.

Pressure may be applied to the upper and lower surfaces of the support rails to deform them adjacent the spigots to render such fixing tamper-proof.

The aperture in the spigot member may be counter bored and cone-shaped members located on the fixing bolts above and below the spigots to deform the apertures in the support rails to provide a tamper-proof fixing.

Figures 2, 3:
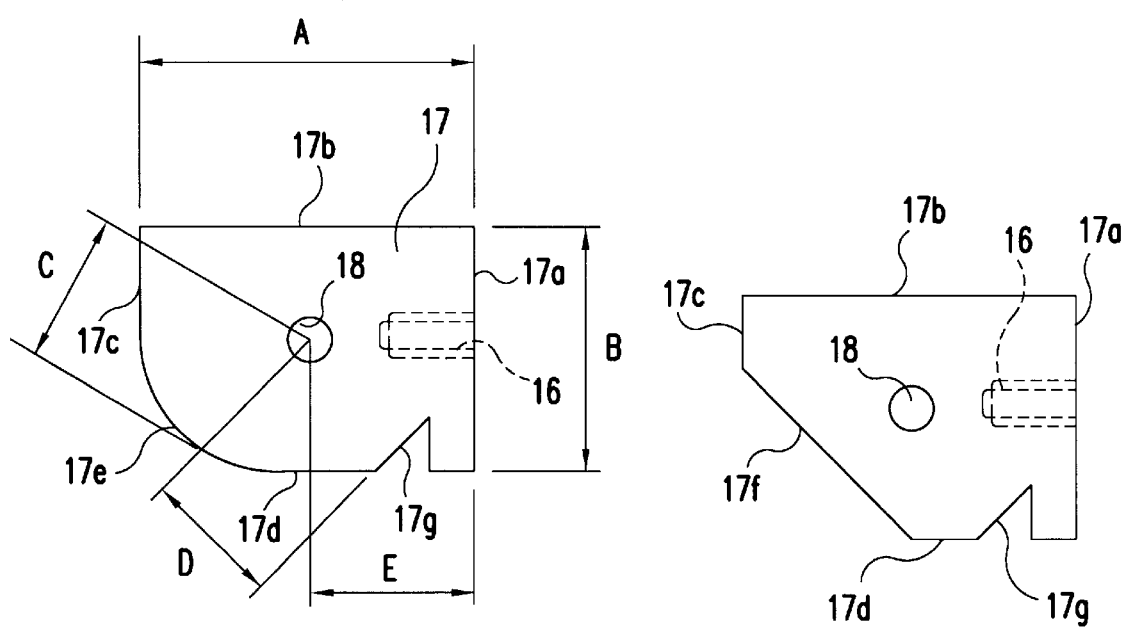

The foregoing and further features of the invention may be more readily understood from the following description of preferred embodiments thereof, by way of example, with reference to the accompanying drawing in which:

FIG. 1 is an exploded perspective view of a portion of railing unit, a mounting and blanking spigot and a support post, and FIGS. 2 and 3 are plan views of two alternative spigots as shown in FIG. 1.

Referring firstly to FIG. 1 of the drawing there is shown a portion of a fencing unit comprising upright railing members 10 located through a longitudinally extending horizontal mounting rail 11. The inner surface and the upper and lower end surfaces of the rails 11 are cut away to form arcuate upper and low surfaces 11a. Alternatively the cut away portion could be provided as a straight line cut at 45° between the inner and end edges of the upper and lower surfaces at 11a. Apertures 12 are formed through the upper and lower surfaces of rail 11 equidistant from the ends and sides thereof.

An upright support post 13 is formed with a screw threaded aperture 14 to receive a fixing stud 15 therethrough and locate within a corresponding screw threaded aperture 16 formed in a mounting and blanking spigot 17. The spigot 17 has a planar end surface 17a and a planar side surface 17b. The other end surface 17c and the other side surface 17d are formed to provide an arcuate surface 17e (FIG. 2) but this could alternatively be formed as a 45° angled surface 17f (FIG. 3). A notch 17g is formed in side surface 17d adjacent end surface 17a. An aperture 18 is formed through spigot 17 so as to be alignable with apertures 12 in rail 11.

A fixing bolt 19 is locatable through apertures 12 and 18 with nut 20 being tightened to provided the fixing. The aperture 18 may be counter bored and a cone 21 located on bolt 19 both above and below spigot 17 so that the apertures 12 are deformed when bolt 19 and nut 20 are tightened to provide a tamper-proof fixing. Additionally or alternatively the upper and lower surfaces of rail 11 can be deformed at spigot 17 to provided such tamper-proof fixing.

When assembling the parts to provide attachment of the railing unit to post 13, spigots 17 are attached to post 13 by fixing studs 15. When the unit is to be located at an angle to post 13, less than 90°, spigot 17 is attached in the position shown in FIG. 1 so that when bolt 19 is located through apertures 12 and 18 the railing unit can be hinged to the required direction and surface 17e or 17f of spigot 17 blanking the gap at 11a of rail 11. When the railing unit is required to form part of a straight line railing assembly of units the spigot 17 is attached to post 13 in its reverse position, rotated through 180° to that shown in FIG. 1, so that surface 17b blanks the gap formed at portion 11a of rail 11.

When the railing unit is required to be located at 90° to an adjacent unit then the post 13 is provided as a 90° angle member with each unit being attached to different angle portions of the post.

In a typical arrangement with the dimensions of rails 11 being 25×50 mm box section the dimensions of spigot 17 are: 'A' 30 mm minimum; '3' 47 mm maximum; 'C' 23.5 mm maximum radius; 'D' 23.5 mm maximum and 'E' 25 mm dead centre.

Hence there is provided a single spigot member 17 which can be utilised to provide fixing of railing units to posts to provide any configuration of railing assembly.

With an alternative fixing arrangement the apertures in rail 11 need not be provided and alternatively pressure is applied to the upper and lower surfaces of rail 11 to provide inwardly depending dimples located in aperture 18 of spigot 17. Hence a fixing is provided without the need for bolt 19.

I claim:

1. An arrangement of a spigot, a rail having a rectangular cross-section defining an interior height and width, and a post, comprising:

a combined mounting and blanking spigot providing fixing between the rail and the post, the spigot comprising a solid member having a height and width slightly less than the interior height and width of the rail, the solid member having a length sufficient to blank a gap between the rail and post, one planar end surface for attachment to the post, one planar side surface, another end surface and another side surface being arcuate or cut away at their adjacent corner, an upper surface, and an aperture formed vertically therethrough at substantially the midpoint of the upper surface, wherein a generally "V"-shaped notch is formed in said other side surface adjacent said one end surface.

2. An arrangement as claimed in claim 1, wherein a screwthreaded aperture is formed in said one end surface for receiving a fixing stud for attachment to the post.

3. An arrangement as claimed in claim 1, wherein the spigot is formed by drop forging.

4. A railing unit including at least two longitudinally extending horizontal mounting rails each having a rectangular tubular cross-section defining an interior height and width and each attached to a support post; and for each rail, a combined mounting and blanking spigot providing fixing between the rail and the post, the spigot comprising a solid member having a height and width slightly less than the interior height and width of the rail, the solid member having a length sufficient to blank a gap between the rail and post, one planar end surface for attachment to the post, one planar side surface, another end surface and another side surface being arcuate or cut away at their adjacent corner, and upper surface, and an aperture being formed vertically therethrough at substantially the midpoint of the upper surface, wherein a generally "V"-shaped notch is formed in said other side surface adjacent said one end surface.

5. A method of mounting a railing unit including at least two longitudinally extending horizontal support rails having a rectangular tubular cross-section to a support post therefor which comprises:

attaching spigots to the support post at heights to correspond with the spacing of the support rails, wherein each spigot comprises a solid member having a height and width slightly less than that of the interior dimensions of the rail and a length sufficient to blank a gap between the rail and post, an upper surface, one end surface being planar for attachment to the post, one side surface being planar, the other end and other side surfaces being formed to be arcuate or cut away at their adjacent corner, and an aperture being formed vertically therethrough at substantially the midpoint of the upper surface thereof;

locating such spigots in the ends of the support rails;

locating fixing bolts through apertures in the support rails and the apertures in the spigots;

adjusting the required direction of the railing unit; and tightening the fixing bolts.

6. A method as claimed in claim 5 wherein the support rails have upper and lower surfaces, and pressure is applied to the upper and lower surfaces of the support rails to deform them adjacent the spigot to render such fixing tamper-proof.

7. A method as claimed in claim 5 wherein the aperture in each spigot is counter bored, and cone-shaped members are located on the fixing bolts above and below the spigots to deform the apertures in the support rails to provide a tamper-proof fixing.

* * * * *